United States Patent [19]

Hogenhout

[11] Patent Number: 4,583,388

[45] Date of Patent: Apr. 22, 1986

[54] METHOD AND APPARATUS FOR HOLE COLDWORKING

[75] Inventor: Franciscus Hogenhout, Redmond, Wash.

[73] Assignee: West Coast Industries, Inc., Seattle, Wash.

[21] Appl. No.: 674,525

[22] Filed: Nov. 23, 1984

Related U.S. Application Data

[63] Continuation-in-part of Ser. No. 537,505, Sep. 30, 1983.

[51] Int. Cl.⁴ ............................................. B21D 41/02
[52] U.S. Cl. .................................. 72/393; 72/453.16; 72/453.18; 29/252
[58] Field of Search ............................ 72/370, 391–393, 72/453.03, 453.16, 453.18; 29/157.3 C, 157.3 H, 252

[56] References Cited

U.S. PATENT DOCUMENTS

| | | | |
|---|---|---|---|
| 2,275,451 | 3/1942 | Maxwell | 72/370 |
| 2,319,216 | 5/1943 | Dewald | 72/393 |
| 2,357,123 | 8/1944 | Maxwell | 72/393 |
| 2,974,712 | 3/1961 | Frye et al. | 72/393 |
| 3,470,724 | 10/1969 | Gregg | 72/393 |
| 4,253,324 | 3/1981 | Nugent | 72/393 |

FOREIGN PATENT DOCUMENTS

| | | | |
|---|---|---|---|
| 186959 | 10/1966 | U.S.S.R. | 72/393 |
| 192159 | 2/1967 | U.S.S.R. | 72/393 |

*Primary Examiner*—Lowell A. Larson
*Attorney, Agent, or Firm*—Mark Zovko

[57] ABSTRACT

A method and apparatus for coldworking of holes using a split mandrel. The apparatus uses a mandrel having a larger diameter end and radially directed slots to permit contraction of its outer diameter as it is fitted within a hole. The mandrel partially contains a pilot in its "at rest" state. After placing the mandrel and pilot within a hole to be coldworked, the pilot is pushed fully into the mandrel solidifying the mandrel. The pilot and mandrel are then withdrawn through the hole, thereby coldworking the hole. An air logic circuit accomplishes the pushing of the pilot within the mandrel and retraction of the pilot and mandrel.

5 Claims, 11 Drawing Figures

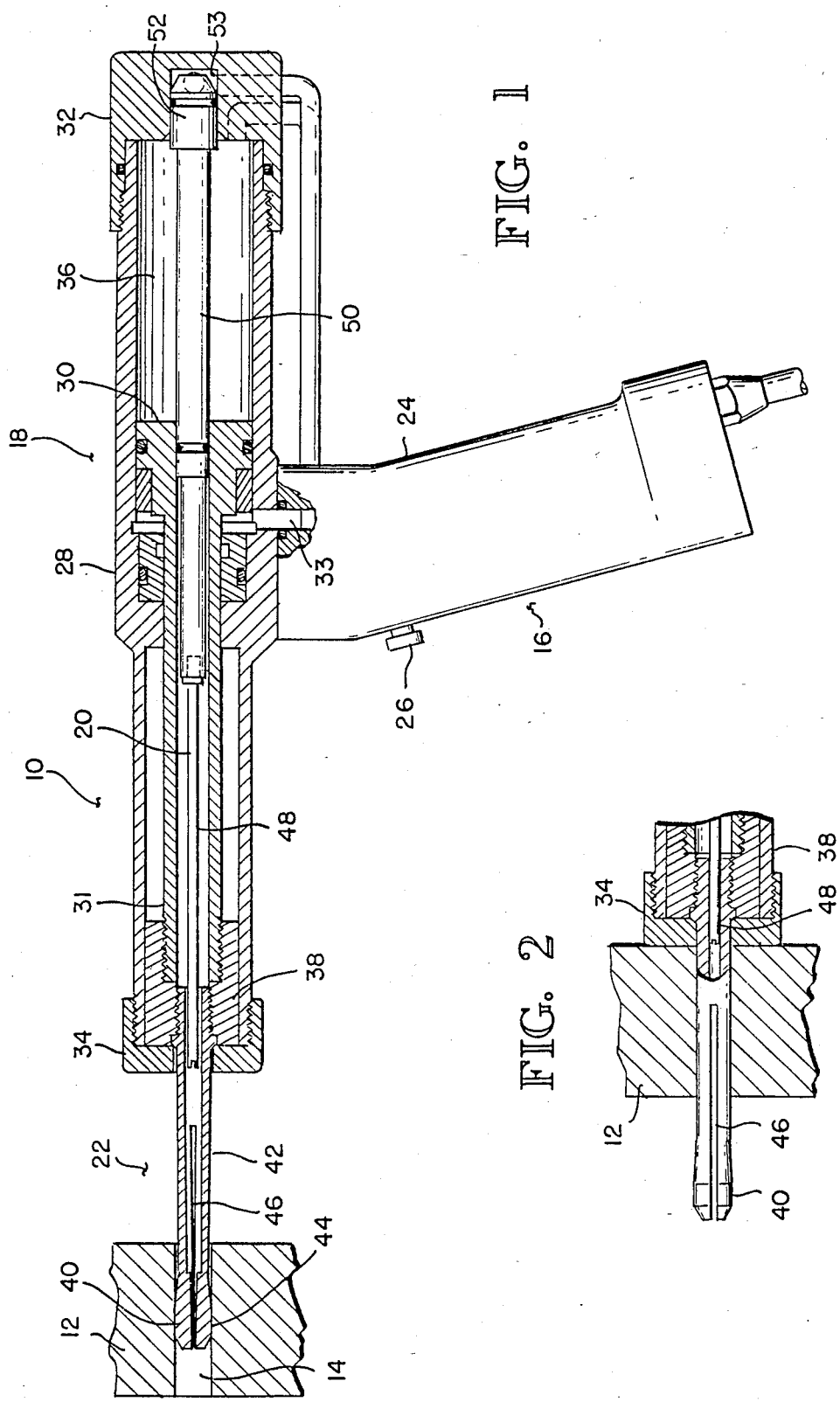

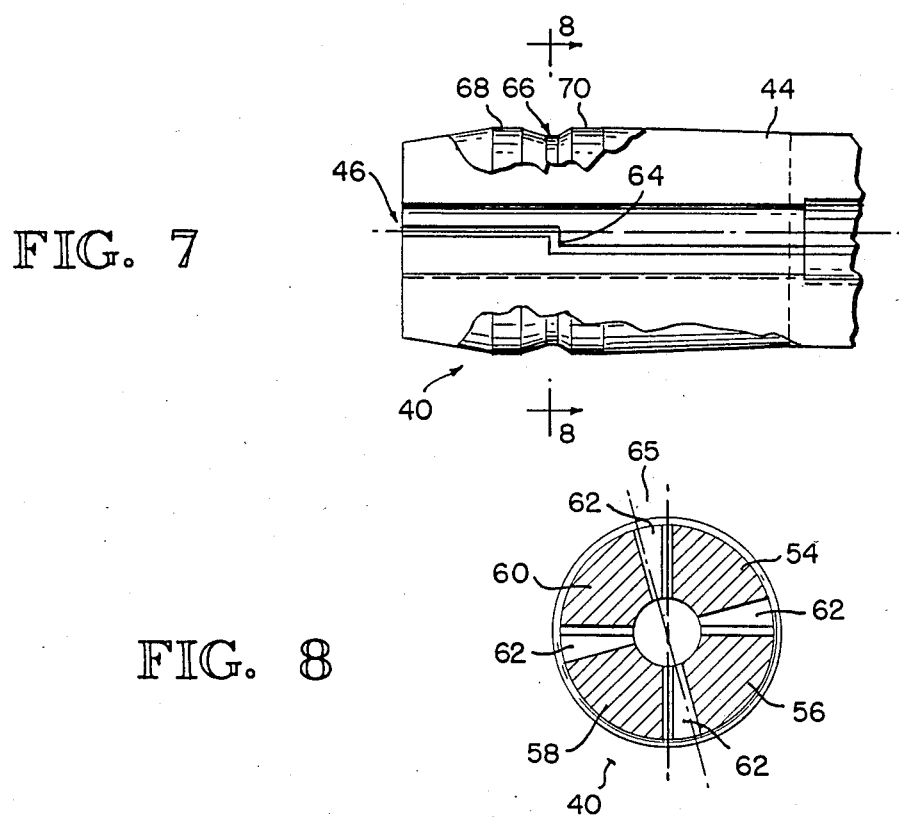
FIG. 7
FIG. 8
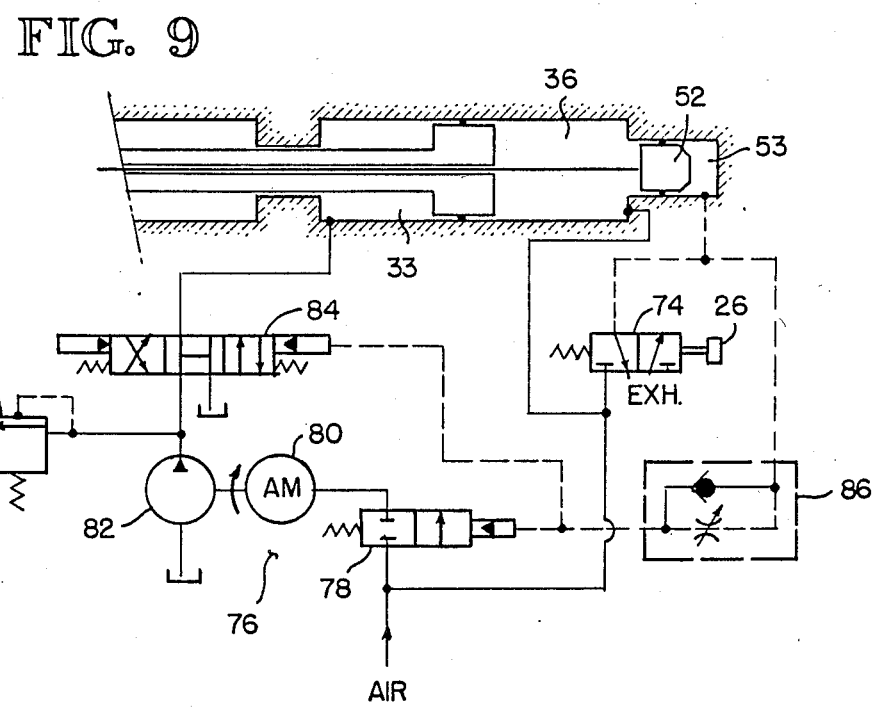
FIG. 9

METHOD AND APPARATUS FOR HOLE COLDWORKING

CROSS RELATION TO OTHER APPLICATION

This application is a continuation-in-part of a previously filed application, Ser. No. 537,505, filed 9/30/83.

BACKGROUND OF THE INVENTION

1. Field of the Invention

This invention relates in general to coldworking of holes, and more particularly to a method and apparatus for coldworking holes, thereby increasing their fatigue life, especially in workpieces under stress. This process is especially necessary in the manufacture of airplane wings and body structures.

2. Description of the Prior Art

In the coldworking process, a mandrel of a diameter larger than a hole is pulled or pushed through the hole to expand the hole radially, displacing the material immediately surrounding the hole beyond the elastic limit of the material. Parts having holes in them which are processed in this manner will exhibit improved fatigue life. Conventionally three basic methods of coldworking holes are known in the industry today.

The first method employs a solid mandrel. The solid mandrel has two different diameters and is employed in conjunction with a puller gun. One diameter is sized to just clear the hole to be coldworked, and the other diameter is dimensioned for coldworking. The two diameters are joined by a tapered section to permit a smooth displacement of the material surrounding the hole. This method required two operators. One operator pushes the small diameter of the mandrel through the hole, and the other operator engages the mandrel with a puller gun and subsequently pulls the large diameter of the mandrel through the hole. Several disadvantages of this method exist. First, the pressures of the workpiece against the coldworking tool are very high, somewhere between the tensile and bearing yield strength of the material being coldworked. This high pressure can cause galling and tool breakage. Another disadvantage is that an operator is required at each side of the workpiece. This mandrel is partly pushed from one direction through the hole by the first operator and attached to a puller gun by a second operator, after which the mandrel is pulled through. Further, the mandrel now has to be returned to the first operator by circumventing the structure containing the hole.

A second method for coldworking holes employs a split mandrel, such as that shown in U.S. Pat. No. 2,357,123, issued to Maxwell. Although the preferred embodiment of the present invention employs a split mandrel, this older method as taught by Maxwell is much different.

Maxwell teaches a split mandrel assembly consisting of a split mandrel on the outside and a tapered pilot on the inside. The tapered pilot enters the hole first, then the split mandrel in its collapsed position also enters and passes through the hole. The tapered pilot is now drawn into the split mandrel thereby expanding the outside diameter of the split mandrel. Subsequently, a shoulder on the tapered pilot seats against the end of the split mandrel and begins to push the expanded split mandrel through the hole, thereby effecting coldworking. This method requires only one operator and is relatively fast. All of the load of pulling, however, is carried by the tapered pilot. The small diameter of the tapered pilot makes the pilot unable to bear such high loads and the tool may fail prematurely. Also, since the split mandrel segments are in compression, they must be sturdy enough not to collapse. The mandrel, therefore, is split only one time into two halves. This results in holes which are oval in shape and therefore of inferior quality. Additionally, because the pilot is tapered, it is difficult to maintain the accuracy of the outside diameter of the expanded split mandrel. Further, the split mandrel generates ridges in the coldworked hole. These ridges reduce the quality of the coldworking, and impact the subsequent reaming operation making it more difficult to produce a quality finish. Finally, in this method the tapered pilot is pulled into the mandrel under a preloaded condition causing premature wearing of the tapered portion of the pilot and the mating surface of the mandrel.

A third method, and one that is quite prevalent today, is the split sleeve and solid mandrel tool. This method described in the U.S. Pat. No. 3,566,662, issued to Champoux permits a single operator to cold work a hole from one side by first introducing a solid mandrel having a reduced diameter portion. A split sleeve rests on the reduced diameter portion during entry into the hole. Then the split sleeve is retained in the hole by the housing of the puller gun while the larger diameter portion of the mandrel is pulled through the split sleeve. It is easy to see several advantages of this presently preferred method: The use of only one operator, the durability of the tool because the tensile stress occurs in a member with a large sectional area, and any slipping occurs between the sleeve and the mandrel, rather than the mandrel and the hole. However, non-symmetrical coldworking is inherent in this method because the sleeve is split only on the side. Also, the operator must install a new sleeve each time a hole is worked, thereby losing time. Also, the sleeves are expensive and must be removed from the hole and discarded.

SUMMARY OF THE INVENTION

The present invention herein described is an improvement in the coldworking process of holes especially in the manufacture of airplanes which eliminates the need for "throw away" pre-lubricated sleeves while producing fatigue performance as good or better than the prior art.

Generally, the method for coldworking holes comprises the steps of inserting a mandrel containing a pilot into a hole to be coldworked. In one embodiment, the mandrel has larger diameter portion at its end and radially directed slots which permit its collapse as it is placed through a hole to be coldworked. The top of the pilot is contained within part of the mandrel when the tool is at rest. To begin cold working the hole, the pilot is pushed fully into the mandrel thereby solidifying the mandrel. A force in the radial direction is transmitted to the hole and coldworking occurs when the now solidified mandrel and the pilot are retracted from the hole. It should be noted that in the retracting operation both the pilot and mandrel are experiencing axial tensile forces, and are sharing the pulling load which results in lower tool stresses and longer tool life.

The apparatus used to practice the invention includes a split mandrel having a larger diameter end portion and at least 3 radial segments to permit contraction of its outer diameter as it is inserted into a hole to be coldworked. The apparatus also has a pilot partly disposed in an axial slot within the mandrel, and a housing for the mandrel and pilot. It can be generally said that pushing means are provided which connect to the pilot for pushing the pilot into the mandrel until the end of the pilot is in the tip of the mandrel. Also retracting means are provided which pull the mandrel containing the pilot through the hole while the pilot is fully engaged in the mandrel, thereby causing coldworking of the hole. In a preferred embodiment of the invention, the pilot is connected by a first piston rod to a first piston which sits in a first cavity while the tool is at rest. The end of the first piston closer to the mandrel is pressured by air pressure to about 100 p.s.i. at all times. A second piston is connected to the mandrel by a second piston rod and is located within the tool housing. The end of this second piston farther away from the mandrel and the end of the first piston closer to the mandrel and the tool housing define a second cavity which is air pressurized at 100 p.s.i. at all times. The first rod connected to the pilot fits within the second piston rod and piston. Hydraulic fluid is located within a third cavity in the tool housing, communicating with the end of the second piston closer to the mandrel. A hydraulic pump is part of the means used to operate the tool and is capable of pressurizing the hydraulic fluid described above. A circuit is provided which causes the first piston connected to the pilot to move into the mandrel due to increased air pressure acting on its one end when a trigger is pulled. This piston moves until it is stopped by the second piston connected to the mandrel. Now the hydraulic pump is started and the hydraulic fluid is pressurized causing the second piston to move away from the hole to be coldworked within the housing. This movement causes the mandrel containing the pilot to be retracted through the hole thereby causing coldworking. When the trigger is released the increased air pressure on the first cavity and the pressurization of the hydraulic fluid in the third cavity is stopped. The air pressure, however, still acts on the second cavity and pushes the second piston back to its initial place within the housing while retaining the first piston in the first cavity.

The air logic circuit preferred in the practice of the invention includes a source of air pressure pressurizing the second cavity described above at all times. The air pressure source is also connected to the first cavity through a first air valve. This first valve also is between the air pressure source and a timer in one embodiment. Further downstream from the timer is a hydraulic valve for pressurizing hydraulic fluid located in the third cavity. Also downstream from the timer, in a parallel path, is a second air valve for pressurizing an air motor connected to a hydraulic pump. The hydraulic pump is located between a tank containing fluid and the third cavity via the hydraulic valve described above. Optionally a relief valve may be provided on the outlet side of the hydraulic pump. In operation, depressing the trigger opens the first valve pressuring the first cavity and moving the pilot fully into the mandrel. Pressing the trigger also causes the second valve to activate the air motor for the hydraulic pump and also opens the hydraulic valve allowing pressurization of the third cavity causing the pilot and mandrel to retract. Release of the trigger exhausts the first cavity and closes the hydraulic valve and second valve to the air motor. The second piston will return to its resting position in the housing while the first piston remains in the first cavity due to pressurization of the second cavity.

As an alternative to the timer mentioned above, a "fail safe" system described fully subsequently can be used and is preferable. The "fail safe" system allows the mandrel to be withdrawn through the hole only when the pilot is fully engaged in the tip of the mandrel.

In a preferred embodiment of the invention the mandrel is split into more than three sections to provide for a more symmetrical and uniform coldworking of the hole. Splitting the mandrel into more than three sections is possible because all of the members of the mandrel and the pilot are in tension during pulling and so are not stressed beyond their endurance. All of the members pulling in one direction lightens the load of any one member. The holes are more round in appearance and require less reaming. In addition, when there are more than two segments to the mandrel the travel of each segment is less. Consequently, any ridges produced in the workpiece are smaller in width and in height.

Also, in another embodiment of the invention the mandrel is split into more than three sections to provide for a more symmetrical and uniform coldworking of the holes wherein the split has an offset located in an annular portion of the mandrel which is non-coldworking such that no ridges are left in the finished hole. While it can be appreciated that no ridges will be superior in quality and appearance than smaller ridges, it is also apparent that the manufacture of an offset split in hardened mandrels is an expensive process and therefore both types of mandrels are disclosed as embodiment forms of the invention. The offset split occurs at a reduced diameter portion of the mandrel located centrally between two larger diameter portions, such that both of the larger diameter portions effect coldworking and the reduced diameter portion is to provide clearance for the offset in the split. This prevents the hole from being scraped by the mismatched portions of the offset in the split during the time that the mandrel is expanded. This offset split mandrel offers a uniquely clean and symmetrical coldworked hole.

It is therefore an object of the present invention to provide a method for coldworking of holes which reduces the need for two operators.

It is further object of the present invention to provide a method and apparatus for coldworking holes which does not require the use of throwaway sleeves, while producing the same or better fatigue performance.

Yet another object of the present invention is to provide a method and apparatus for coldworking holes which is as good as the prior art yet is significantly less expensive.

Another object of the present invention is to provide a tool assembly for coldworking holes which produces a more symmetrical, higher quality coldworked hole.

Yet another object of the invention is to provide a hole expanding tool assembly with a split mandrel, wherein both the pilot and the mandrel are under tensile stress during the pulling operation. This embodiment provides for a sharing of the pulling load by the pilot and the split mandrel which results in lower tool stresses and longer tool life.

Another object of the present invention is to provide a method of coldworking holes which will leave no ridges in the hole.

An alternative embodiment of the invention is also disclosed which contains a split mandrel and pilot. In this embodiment, however, a spring is provided which retains the pilot engaged in the mandrel when the tool is at rest. To operate the tool the operator pulls a slide connected to the pilot so that the pilot is withdrawn from the mandrel as the mandrel is inserted in a hole to be coldworked. After insertion, the slide is released and the force of the spring pushes the pilot into the mandrel. The pilot and mandrel can then be retraced by a conventional puller ram connected to the mandrel.

BRIEF DESCRIPTION OF THE DRAWINGS

These and other objects and advantages of the present invention will become more apparent from the following description taken in conjunction with the accompanying drawings. In the drawings:

FIG. 1 is a sectional elevation view showing the tool of the invention as it is being inserted into a hole to be coldworked.

FIG. 2 is a sectional elevation view as in FIG. 1 showing the mandrel and pilot portion of the tool as the tool is inserted fully in a hole to be coldworked. The pilot is in a retracted position as in FIG. 1.

FIG. 7 is an enlarged view of the split mandrel nose, showing the offset split embodiment.

FIG. 8 is a sectional view of the offset split mandrel viewed from the left through line 8—8 of FIG. 7.

FIG. 9 is a schematic of the circuit used to control the apparatus during operation.

DETAILED DESCRIPTION OF THE PREFERRED EMBODIMENT

Referring to FIG. 1, a split mandrel hole expanding tool assembly generally designated as 10 is shown. A workpiece 12 having a hole 14 to be coldworked is shown to the left of the assembly 10. Hole 14 is of such a diameter that pulling the split mandrel assembly through it will cause coldworking.

The tool assembly 10 contains a trigger handle, a puller gun assembly, a pilot assembly, and a split mandrel assembly, generally designated as 16, 18, 20, and 22, respectively.

Figure 3:
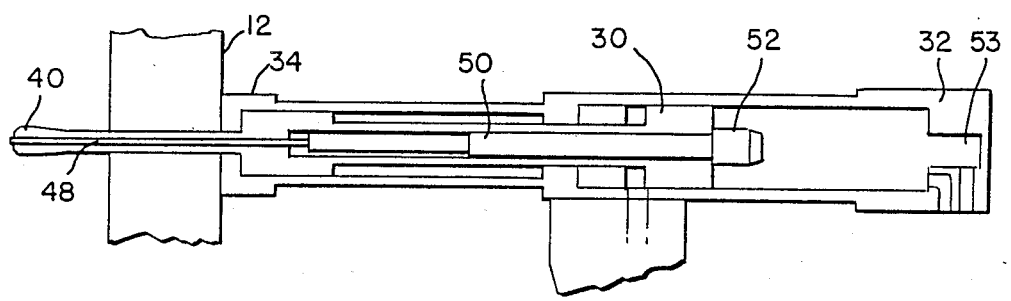
FIG. 3 is a schematic cutaway view showing the pilot fully engaged in the mandrel immediately prior to retraction of the pilot and mandrel through the hole.
Figure 5:
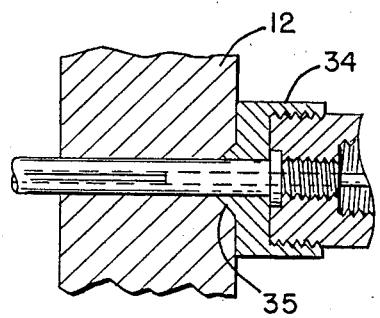
FIG. 5 shows an alternative nose cap on the tool for use with countersunk holes.

The trigger handle 16 consists of handle 24 and trigger button 26. The puller gun assembly 18 consists of housing 28, piston 30, piston rod 31, end cap 32, and nose cap 34. Piston 30 is disposed in cavity 36 of housing 28. A small cavity 33 communicates directly with the end of piston 30 closer to the workpiece during operation. Cavity 33 contains a hydraulic fluid. Piston rod 31 is connected to piston 30. End cap 32 is threaded over the end of housing 28. Nose cap 34 is similarly threaded over the other end of housing 28, closer to the workpiece 12. FIG. 5 shows a special nose cap 34 with a tapered portion 35 to fit a countersunk hole. For normal holes, however, the tapered portion 35 would be omitted. Split mandrel assembly 22 consists of coupling 38 and split mandrel 40. Split mandrel 40 has a barrel portion 42 and a larger diameter tapered tip portion 44. The tip portion 44 if viewed in cross section contains radial slots defining segments of mandrel 40. The splitting of mandrel 40 into segments allows contraction of its outside diameter to occur when the mandrel 40 is placed in hole 14 to be coldworked as shown in FIG. 1. Split mandrel 40 also has an axial slot 46 throughout its length. Mandrel 40 is threaded to coupling 38 which in turn is threaded to piston rod 31 of puller gun assembly 18. Pilot assembly 20 contains a pilot 48, a piston rod 50 and piston 52. The pilot 48 is threaded into piston rod 50 which is connected to piston 52. Pilot 48 is partly disposed in slot 46 of split mandrel 40 when the tool is at rest, and piston rod 50 is contained within piston 30 and cavity 36 of housing 28. Piston 52 fits within cavity 53 located within end cap 32 when the tool is at rest. The end of pilot 48 is capable of fully engaging within the tip portion 44 of mandrel 40 when piston 52 is moved fully toward the workpiece 12 as shown in FIG. 3.

Referring now to FIGS. 7 and 8, an embodiment of split mandrel assembly 22 is shown wherein mandrel 40 has four segments designated as segments 54, 56, 58 and 60 with an offset split 62 between each segment. Figure shows the offset 64 of offset split 62. The offset split 62 is accomplished by sweeping a split cut through an angle 65 (FIG. 8) about the longitudinal axis of mandrel 40. It should be noted that offset 64 of offset split 62 is located in a recessed diameter portion 66 of mandrel 40. Recessed diameter portion 66 of mandrel 40 is located between coldworking diameter portions 68 and 70 of mandrel 40. Locating offset 64 of offset split 62 in recessed diameter portion 66 of mandrel 40 between coldworking diameter portions 68 and 70 provides a means of pulling two coldworking diameter portions through one hole in succession with each portion having a different radial location for its split. The result of this configuration will be that the coldworked hole 14 will have a clean bore with no ridges or extraneous marks from offset 64 or offset split 62. The present invention may also be practiced without an offset split 62. The mandrel 40, in this case, would still be divided preferably into four segments similar to segments 54, 56, 58 and 60 in FIG. 7, but it would have no offset. As this type of mandrel is retracted through hole 14 in workpiece 12, small ridges would occur at four radial locations. These ridges could be reamed after coldworking. Also, it should be noted that the mandrel 40 can have as few as three segments and still work. Four segments would be used in a preferred embodiment.

The tool assembly 10 is powered by the system shown schematically in FIG. 9. Referring to FIG. 9, a source of air pressure 72 is connected to cavity 36 resulting in its pressurization at all times. Typically, cavity 36 would be pressurized at 100 p.s.i. The source of air pressure 72 is also connected to cavity 53 through air logic valve 74. When the tool is at rest, air logic valve 74 to cavity 53 is closed, resulting in cavity 53 being exhausted. Due to the pressure on the end of piston 52 communicating with cavity 36, piston 52 remains in cavity 53 when the tool is at rest.

The source of air pressure 72 is further connected to a hydraulic power supply generally designated as 76. A separate air valve 78 is connected to the air pressure source 72 which in turn is connected to an air motor 80 for driving a hydraulic pump 82 connected to a source or tank of hydraulic fluid (not shown). The pump 82 is connected through a hydraulic valve 84 to cavity 33 which would contain hydraulic fluid. The source of air pressure 72, therefore, if activated, is capable of opening the air valve 78 which then starts air motor 80 of hydraulic pump 82. Air pressure source 72 can also open hydraulic valve 84 which now will result in pressurization of the fluid in cavity 33 and movement of piston 30 during operation of the tool. A relief valve 88 is provided to prevent overpressurization of the hydraulic fluid. To provide a time delay between the opening of air valve 74 and air valve 78 a timer 86 is connected to air pressure source 72 and valves 74 and 78. The timer 86 merely prevents full flow of air in one direction through valve 87 toward the hydraulic valve 84 and power supply 76 when trigger 26 is depressed. The air must flow through valve 89 of timer 86 and the air pressure to valve 78 and valve 84 takes some time to increase and activate these valves. When trigger 26 is released air is exhausted through valve 87 at full flow with no delay. A time delay between the opening of valves 74 and 78 will insure that piston 52 has come to rest meaning that pilot 48 is fully within mandrel 40 before piston 30 begins to travel. Initiation of the tool assembly's operation is caused by depressing trigger 26 which is connected to the air pressure source 72.

To operate the tool, an operator would insert mandrel 40 into hole 14 of workpiece 12 until the nose cap 34 touches the workpiece 12 as shown in FIGS. 2 and 3. Trigger 26 would then be depressed, thereby opening valve 74 and causing air pressure of approximately 100 p.s.i. to fill cavity 53. Piston 52 will begin to move toward the workpiece 12 until it contacts piston 30 of puller gun assembly 18. This operatonal position is shown in FIG. 3. To avoid clearance problems, pilot 48 would not protrude from the tip portion 44 of mandrel 40. Depressing trigger button 26 and opening of valve 74 simultaneously activates air pressure from source 72 toward the hydraulic power supply 76. This build-up of air pressure will cause the air valve 78 that starts the air motor 80 to open, energizing the hydraulic pump 82 and shifting the hydraulic valve 84 open allowing high pressure hydraulic fluid to pressurize cavity 33 causing piston 30 with the mandrel 40 solidified by pilot 48 to move in unison (see FIG. 4) until the mandrel is fully retracted from the hole 14, leaving the hole coldworked.

Figure 4:
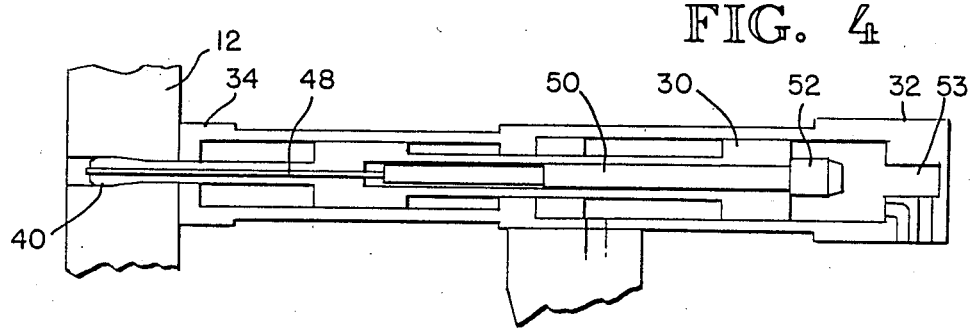
FIG. 4 is a schematic cutaway view similar to FIG. 3 which shows the action of the mandrel and relative position of other parts of the tool as the mandrel is retracted through the tool.

A time delay between the full engagement of the pilot 48 in mandrel 40 and retraction of the pilot 48 and mandrel 40 is preferable to obviate the problem of mandrel 40 retracting prior to the full engagement of the pilot 48. This delay can be accomplished by timer 86 or as described subsequently. As shown in FIG. 4, pilot 48 and mandrel 40 will retract through hole 14 together, being maintained in axial tension and effect coldworking of hole 14. This pulling places pilot 48 and mandrel 40 in tension in such a way that each is under less stress with respect to prior art concepts and tool longevity is assured. As mentioned previously, one of the prior art concepts pulled the pilot which pushed the mandrel through the hole and caused tool failure problems.

Release of trigger button 26 by the operator will: (a) close valve 74 thereby exhausting cavity 53; (b) shift the air supply valve 78 of the motor 80 to a shut off position; and (c) shift the hydraulic valve 84 to an exhaust position. The fluid in cavity 33 is now not pressurized. The piston 30 and mandrel 40 now return to the position shown in FIG. 1, retaining piston 52 in cavity 53 and the pilot assembly 22 in place due to the pressurization of cavity 36 from air pressure source 72.

Figure 10:
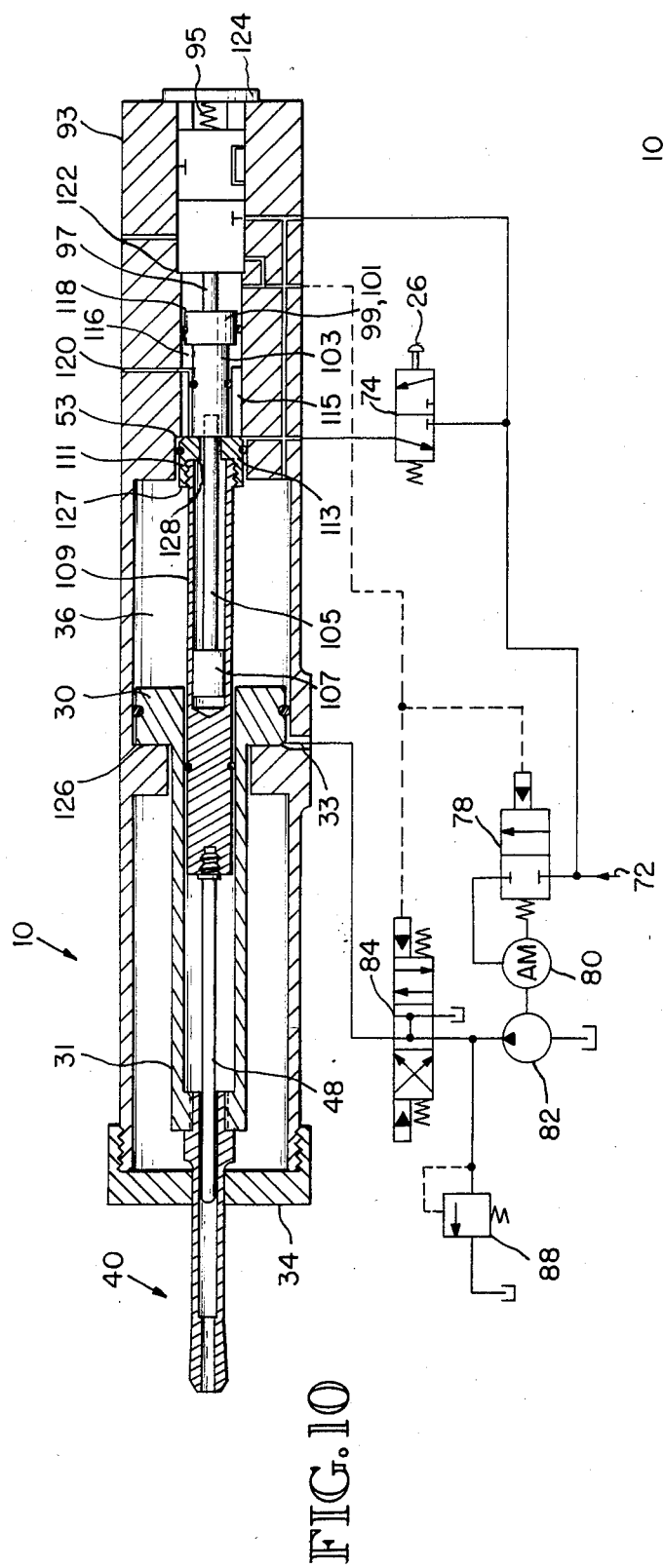
FIG. 10 is a schematic of the tool and circuit showing the "fail safe" features of the present invention.

As an alternative to timer 86, the system shown in FIG. 10 can be used. This system has advantages over using the timer 86 as described above, including a built in "fail safe" feature, i.e., the operator cannot influence or interrupt the cycle once it begins, and the mandrel 40 will not retract prior to full engagement of the pilot 48 therein. Also, the system of FIG. 10 permits a more compact design that ultimately results in a reduced failure rate of the tool. Referring to FIG. 10, a significant portion of the tool is identical to that described in FIG. 1 and the same reference numerals have been used where appropriate. As in FIG. 1 a tool assembly generally designated as 10 is disclosed Mandrel 40, pilot 48, piston 30, piston rod 31, nose cap 34, and trigger 26 are identical to those parts described in FIG. 1 previously, and function similarly. Cavity 33, cavity 53, and cavity 36 are similar to those previously described. In the air logic system connected to tool assembly 10, valve 74, air supply 72, air valve 78, air motor 80, hydraulic pump 82, hydraulic valve 84 and relief valve 88 are identical to those previously described in FIG. 9 and will retain the same numerical designation as that figure. The difference in this system lies mainly in the fail safe assembly generally designated as 91 in FIG. 10. Fail safe system 91 contains valve 93 enclosed within the now extended housing 28. Valve 93 is a commercially available 3-way, spring return valve. When valve 93 is "at rest" it is normally open outside of the fail safe assembly 91. In the "at rest" position within the fail safe assembly 91, however, valve 93 is held closed by the compression of spring 95 of valve 93. Valve 93 also has a valve stem 97 which contacts a larger diameter portion 99 of piston 101. Piston 101 also has a smaller diameter portion 103 directly connected to larger diameter portion 99. Extending from smaller diameter portion 103 of piston 101 is a rod 105 having a nut 107 on its end closest to the mandrel 40. Rod 105 is connected to the smaller diameter portion 103 of piston 101 and is disposed within a hollow pilot holder 109. Pilot 48 is threaded to pilot holder 109 at one end and a nipple 111 is connected to the other end of pilot holder 109. Part of the surfaces of nipple 111 and housing 28 define cavity 53. Nipple 111 is analogous to piston 52 of FIG. 1 and 9. Nipple 111 contains an opening 113 to allow rod 105 to pass therethrough, and be connected to smaller diameter portion 103 of piston 101. Sleeve 115 fits around smaller diameter portion 103 of piston 101 and is retained in housing 28 by a set screw (not shown). It should be noted that cavity 116 is now defined by part of the surface of smaller diameter portion 103 of piston 101, larger diameter portion 99 of piston 101, sleeve 115, and housing 28. Also part of the surfaces of valve 93, valve stem 97, housing 28 and the larger diameter portion 99 of piston 101 define cavity 118. Cavity 116 is capable of being exhausted by exhaust 120. As valve 93 is "at rest" within housing 28, it abuts shoulder 122 of housing 28 and is retained in housing 28 by retainer 124 which in turn is held to housing 28 by screws (not shown).

Referring again to FIG. 10, the air logic system used to activate the tool assembly 10 comprises a pressurized shop air supply 72 connected directly to cavity 36 pressurizing this cavity to about 100 psi at all times. Shop air supply 72 is also connected to valve 93 and to air valve 78 which is closed when the tool is "at rest." Shop air supply 72 is also connected to air logic valve 74 which in turn communicates with cavity 53. Valve 74 is closed when the tool is "at rest." Trigger 26 is connected to air logic valve 74 and when depressed is capable to opening valve 74. Air valve 78 communicates with cavity 118 and "at rest" this cavity is at atmospheric pressure. Air valve 78 is also connected to air motor 80 which in turn is used to drive hydraulic pump 82. Hydraulic pump 82 is connected to a source (not shown) of hydraulic fluid. A relief valve 88 is connected downstream of pump 82 to prevent overpressurization. Pump 82 is also connected to hydraulic valve 84 which in turn is connected to cavity 33 of tool assembly 10. Hydraulic valve 84 communicates with cavity 118 and is closed when the tool is "at rest." Cavity 33 would contain unpressurized hydraulic fluid in the "at rest" position. It should be noted that throughout the system, standard O-ring seals are provided as needed to prevent air leakage.

To operate the tool assembly of FIG. 10, the operator would depress trigger 26. Prior to depressing trigger 26, the following description of the system applies: Cavity 36 is pressurized by shop air supply 72 thereby retaining piston 30 to the left most position in FIG. 10 against shoulder 126 of housing 28, and retaining nipple 110 within cavity 53; valve 93 is closed due to compression from piston 100; cavity 116 and 118 are at atmospheric pressure; airlogic valve 74, air valve 78, and hydraulic valve 84 are closed. When trigger 26 is depressed, air logic valve 74 is opened, thereby pressurizing cavity 53. Pressurization of cavity 53 results in the travel of pilot 48, philotholder 109 and nipple 111 toward the hole to be coldworked. This movement continues until the surface 127 of nipple 111 contacts the piston 30. At this point, the pilot 48 is fully engaged in the tip portion 44 of mandrel 40. Just prior to nipple 111 and piston 30 contacting, the inside surface 128 of nipple 111 will contact nut 107 and cause movement of nut 107, rod 105, and piston 101 toward the workpiece slightly. This movement of piston 101 will now allow spring 95 of valve 93 to expand and open valve 93, thereby pressurizing cavity 118 from shop air supply 72. Pressurization of cavity 118 will insure piston 100 stays in place and valve 93 will remain open until the cycle is completed. Since cavity 118 communicates with air valve 78 and hydraulic valve 84, air valve 78 and hydraulic valve 84 will now be activated open starting air motor 80 which in turn will start pump 82. Pump 82 will begin pumping hydraulic fluid through now opened hydraulic valve 84 pressurizing the hydraulic fluid in cavity 33 and causing the piston 30 to move away from the workpiece thereby drawing the mandrel through the hole. It should be noted that cavity 118 being pressurized will effect a "lock" to hold piston 101 away from valve stem 97 until piston 30 is fully retracted, and contacts the inside surface 127 of nipple 111, pushing piston 101 toward valve 93 until spring 95 is compressed thereby closing valve 93. At this point, cavity 118 is exhausted closing valves 74, 78 and 84, the hydraulic fluid of cavity 33 is unpressurized and cavity 53 is exhausted since valve 74 is closed. Since valve 78 is closed, air motor 80 stops and consequently pump 82. The hydraulic pressure is thus relieved and hydraulic fluid drains back to its source. Since air pressure from air supply 72 is maintained to cavity 36, piston 30 will travel to its original "at rest" position shown in FIG. 10, while nipple 110 will be retained in cavity 53.

Figure 11:
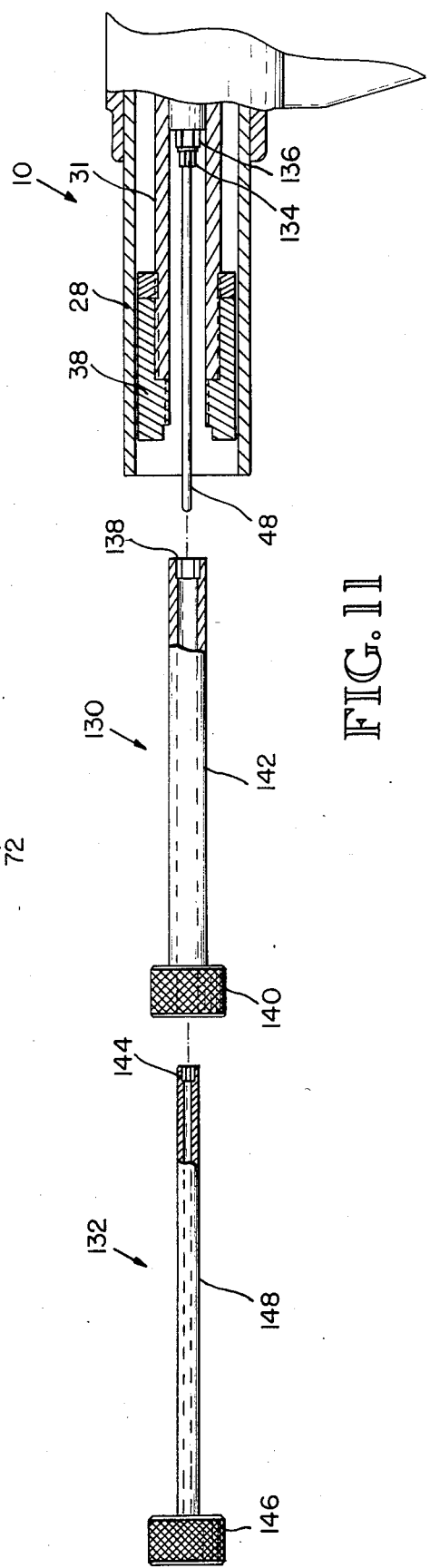
FIG. 11 is a schematic of the coldworking tool with a pilot holder wrench and a pilot wrench.

FIG. 11 shows a tool assembly 10 with a pilot holder wrench 130 and pilot wrench 132 used in combination to facilitate removal of the pilot 48 from tool assembly 10. In this embodiment, pilot 48 has a nut 134 on its one end and pilot holder 109 has a nut 136 on its end. Pilot 48 is threaded into pilot holder 109. Coupling 38 fits over pilot 48 and is threaded to rod 31. When the tool is assembled mandrel 40 is threaded to coupling 38. End cap 34 is threaded to housing 28 and retains the mandrel 40 and the other components of the tool in housing 28 as disclosed in FIG. 1.

Pilot holder wrench 130 has a hexagon socket portion 138 on one end and a holder 140 on its other end. A hollow rod 142 connects the holder 140 and socket portion 138. Pilot wrench 132 is similarly constructed with a socket portion 144, a holder 146 and a rod 148 connecting socket portion 144 and holder 146. To use pilot holder wrench 130 and pilot wrench 132, end cap 34 is removed from housing 28. In turn, mandrel 40 is removed from coupling 38. The pilot holder wrench 130 is placed in the housing 28 with the socket portion 138 placed over nut 134. The pilot wrench 132 is now placed into the pilot holder wrench 130 until engagement with nut 134 is obtained. The pilot 48 can now be removed by holding holder 140 of pilot holder wrench 130 fast while turning holder 146 of pilot wrench 132. Using this technique, a pilot 48 can be easily removed from the front end of tool assembly 10 as opposed to disassembling the entire tool assembly from the rear.

ALTERNATIVE EMBODIMENT

Figure 6:
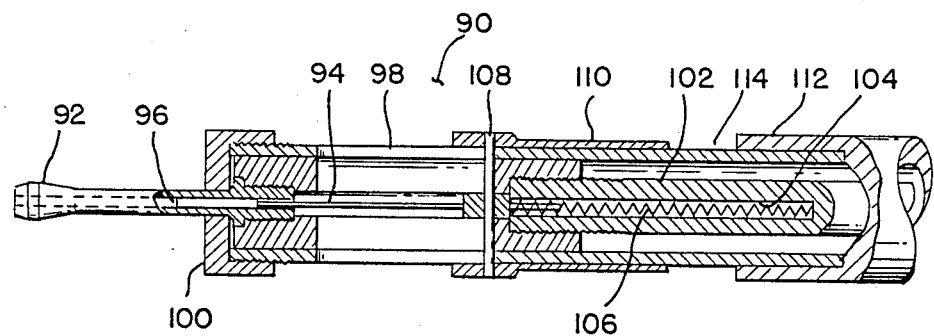
FIG. 6 shows an alternative embodiment of the invention in cross section.

Referring to FIG. 6, an alternative embodiment of the present invention is shown.

FIG. 6 shows a coldworking tool assembly generally designated as 90 having a mandrel 92 and a pilot 94 contained in an axial slot 96 within the mandrel 92 similar to the pilot and mandrel of FIG. 2. The mandrel 92 is a split mandrel and is threaded to a coupling 98. A nose cap 100 is threaded to coupling 98. Coupling 98 is also threaded to receive a piston rod 102 on the side opposite mandrel 92. A slot 104 is drilled in the piston rod 102 to accept a spring 106. Spring 106 contacts at one end the pilot 94. The coupling 98 is slotted in the axial direction to allow pin 108 to move freely. Pin 108 is connected to pilot 94. A slide 110 is provided which surrounds coupling 98 and accepts pin 108. Slide 110, therefore, can be moved manually over the coupling 98. The piston rod 102 is connected to a standard puller gun (not shown). A housing 112 fits around a tube 114 which receives coupling 98.

In operation, the tool shown in FIG. 6 works as follows. In the rest position spring 106 retains the end of the pilot 94 within the tip of the mandrel 92. Prior to the insertion of the mandrel into the hole to be coldworked, slide 108 is pulled away from the hole, thereby compressing the spring 106 and removing the end of the pilot 94 from the tip of mandrel 92. The mandrel 92 is then inserted in the hole to be coldworked and the slide 110 released. The force of spring 106 will cause the end of the pilot 94 to once again engage in the tip of mandrel 92. The mandrel 92 containing the pilot 94 can then be retracted by the puller gun (not shown), causing the hole to be coldworked. It should be noted that pilot 94 can also be moved automatically instead of manually by extending the pilot 94 through the housing 112 to an air logic controlled "piggy back" cylinder (not shown).

The invention may be embodied in other forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim is as follows:

1. Apparatus for coldworking holes in an associated workpiece comprising:
   a. a mandrel having an axially directed slot and at least three radially directed slots therein defining at least three segments of the mandrel to permit contraction of the outer diameter of the mandrel, thereby facilitating insertion of the mandrel in a hole to be coldworked;
   b. a pilot disposed within the axially directed slot of said mandrel;
   c. housing means for housing a portion of said mandrel containing said pilot;
   d. a first piston disposed within said housing means and connected to said pilot, said housing having a cavity for receiving said first piston when the apparatus is at rest;
   e. a source of air pressure located outside of said housing means and communicating with the end of said first piston closer to said mandrel causing said first piston to remain in said cavity when the apparatus is at rest, said source of air pressure connected with the end of said first piston farther away from said mandrel;
   f. a first valve located between said source of air pressure and the end of said first piston farther away from said mandrel, the opening of said first valve initiating movement of said first piston within said housing means;
   g. a second piston disposed in said housing means and connected to said mandrel, the end of said second piston farther away from the workpiece during operation communicating with said source of air pressure;
   h. hydraulic fluid disposed in said housing means communicating with the end of said second piston closer to the workpiece during operation of the apparatus;
   i. a hydraulic pump located outside said housing means for pressurizing said hydraulic fluid, said hydraulic pump connected to and activated by said source of air pressure;
   j. a second valve located between said hydraulic pump and said second piston, said second valve connected to said source of air pressure and allowing passage of said hydraulic fluid therethrough when open;
   k. a third valve located between said source of air pressure and said hydraulic pump, said third valve initiating said hydraulic pump when open;
   l. a fourth valve connected to said air pressure source and said second and third valves; and activation means for opening said fourth valve causing opening of said second and third valves only after said first piston has moved within said housing means and fully engaged said pilot in the tip of said mandrel;
   m. trigger means located on said housing means, said trigger means when depressed activating the opening of said first valve thereby causing said first piston to move within said housing means and engage the end of said pilot in the tip of said mandrel, said trigger means when depressed activating the opening of said second valve, said third valve, and said fourth valve causing said second piston to move after said first piston has fully engaged said pilot within said mandrel and thereby pull said mandrel containing said pilot through the hole to be coldworked, said trigger means when released activating the closing of said first, second, third and fourth valves.

2. The apparatus of claim 1 which includes stopping means disposed within said housing means for preventing said pilot from protruding from said mandrel.

3. The apparatus of claim 2 wherein said stopping means consists of said second piston.

4. The apparatus of claim 1 wherein said mandrel contains four radially directed slots defining four (4) segments of the mandrel.

5. The apparatus of claim 4 wherein the mandrel has an annular recess with said four radially directed slots being offset at the annular recess of said mandrel so that the outer surface of said mandrel contacts a different radial location of the coldworked hole as said mandrel is retracted through the hole.

* * * * *